United States Patent [19]

Klischat

[11] Patent Number: 4,923,320
[45] Date of Patent: May 8, 1990

[54] DISENGAGEABLE COUPLING

[75] Inventor: Ditmar Klischat, Velbert, Fed. Rep. of Germany

[73] Assignee: Gelenkwellenbau GmbH, Fed. Rep. of Germany

[21] Appl. No.: 209,413

[22] Filed: Jun. 20, 1988

[30] Foreign Application Priority Data

Jun. 19, 1987 [DE] Fed. Rep. of Germany ....... 3720281

[51] Int. Cl.$^5$ .............................................. F16D 1/06
[52] U.S. Cl. .......................................... 403/5; 403/15; 403/26; 403/36; 403/37; 403/259; 29/421.1; 192/56 F
[58] Field of Search ................... 403/15, 5, 26, 36, 37, 403/245, 256, 259; 29/421 R, 446; 192/56 F, 74; 464/38

[56] References Cited

U.S. PATENT DOCUMENTS

| 3,547,244 | 12/1970 | Fergie | 192/74 |
| 3,930,382 | 1/1976 | Timtner | 464/38 X |
| 4,093,052 | 6/1978 | Falk | 403/372 X |
| 4,405,251 | 9/1983 | Kolchinsky et al. | 403/9 |
| 4,705,421 | 11/1987 | Depping | 403/15 X |
| 4,724,693 | 2/1988 | Tedder | 29/421 R X |

FOREIGN PATENT DOCUMENTS

| 2525710 | 10/1983 | France | 403/2 |
| 456929 | 2/1975 | U.S.S.R. | 403/5 |
| 2206181 | 12/1988 | United Kingdom | 403/259 |

OTHER PUBLICATIONS

Konstruktion 3.Jahrgan 1951, Heft 11 (1 page).

Primary Examiner—Andrew V. Kundrat
Assistant Examiner—Franco S. Deliguori
Attorney, Agent, or Firm—Toren, McGeady & Associates

[57] ABSTRACT

A disengagable coupling comprising a first part (1) affording a bore (3) and a second part (2) comprising a sleeve (5) and a drive flange (6). The sleeve (5) fits in the bore (3) and contains an insert (8) with collars (9,10) between which is defined a chamber (4) for the reception of oil under pressure to expand the sleeve into frictional engagement with the wall of the bore (3) for torque transmission. There may be a pressure release valve response to relative movement between the first and second coupling parts to release the coupling in case of overload.

10 Claims, 5 Drawing Sheets

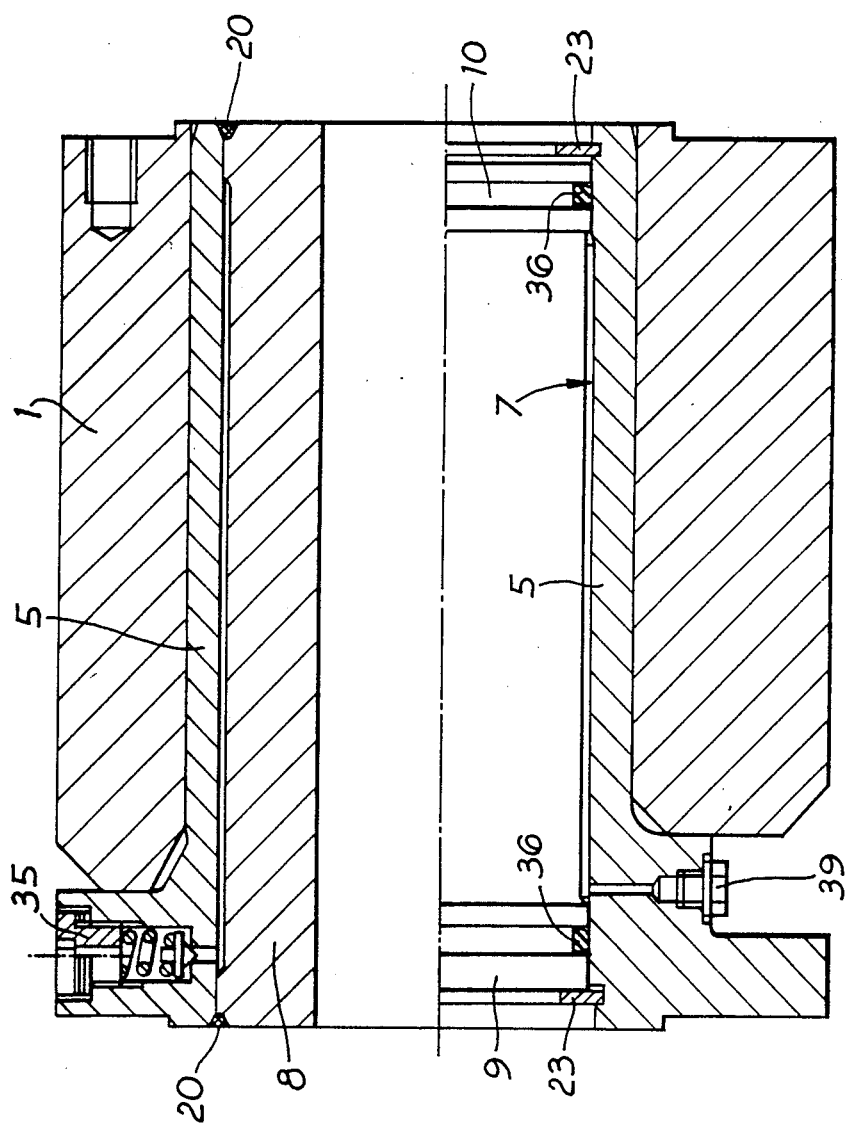

DISENGAGEABLE COUPLING

BACKGROUND TO THE INVENTION

1. Field of the Invention

This invention relates to a disengageable coupling comprising a first coupling part affording a bore and a second coupling part which is insertable into the bore in the first coupling part, a frictional connection between the first and second coupling parts being established by expanding the second coupling part by fluid pressure into engagement with the first coupling part.

2. Prior Art

In one previously proposed form or coupling (US-PS 2720735), two interfitting coupling parts have a hose inserted in helical configuration between them, and by internally pressurising the hose it is engaged with the two coupling parts so as to be able to transmit torque between them. The disadvantage of such a design is that the hose itself takes part in the torque transmission, and the material thereof is subject to high loads.

A further design of coupling proposed in US-PS 4428737 has, interposed between a shaft and a hub, a coupling sleeve which is in the form of a number of joined I-section annular strips providing annular chambers for receiving fluid under pressure. However, the sleeve itself transmits torque between the shaft and hub and leakage is possible in the welded joint between the annular strips. A further disadvantage is that the coupling requires to be of large dimensions.

SUMMARY OF THE INVENTION

It is the object of the present invention to provide a coupling wherein the above described disadvantages are overcome or reduced.

According to the invention, we provide a coupling comprising a first coupling part affording a bore; a second coupling part comprising a sleeve insertable into the bore in the first coupling part and a flange for driving connection, the sleeve affording a bore; and an insert fitting within the bore in the sleeve and having spaced collar formations for sealing engagement with the wall of the bore in the sleeve, and a portion between the collar formations defining a space for reception of a fluid which can be pressurised to expand the sleeve into frictional engagement with the wall of the bore in the first coupling part.

Between its collar formations, the insert defines an annular space for receiving fluid (usually a suitable hydraulic oil) under pressure, by which the sleeve is expanded to engage the wall of the bore in the first coupling part, so as to be able to transmit torque by friction therewith. As the second coupling part is in the form of the sleeve with a flange for driving connection to it, the insert within the second coupling part does not partake in any torque transmission. The possibility of leakage is thus reduced.

The insert may be a solid component, or may be a thick walled tube, whose wall thickness has to be sufficient to avoid deformation by the fluid pressure which is applied between it and the second coupling part. The insert has to be stiffer than the sleeve which is to expand under the pressure.

The collar formations, at the ends of the insert, may be welded to the wall of the bore in the second coupling part. The welds, although having to be strong enough to withstand the fluid pressure involved, do not transmit any torque so may be relatively weak.

As an alternative, the collar formations of the insert can be provided with seals, e.g. O-ring type seals, to establish fluid-tight engagement with the wall of the bore in the second coupling part. In this design the insert may be secured against axial displacement relative to the second coupling part by suitable securing rings.

If the coupling is intended to be used as a coupling which provides for slippage between the first and second coupling parts if there is an overload, the second coupling part may be supported by bearing means relative to the first coupling part. Such bearing means may comprise rolling element bearings.

For torque transmission therewith, the flange of the second coupling part may be provided with circumferentially disposed bores for receiving fixing bolts.

To receive the hydraulic fluid under pressure between the second coupling part and the insert therein, only a small chamber is required. In a preferred embodiment, the portion of the insert between the collar formations thereof may have a diameter between 1 and 5 mm smaller than the facing part of the bore in the second coupling part.

The first coupling part may be either the driving or driven element of the coupling. The first coupling part may take the form of a thick walled sleeve, having an end surface provided with threaded bores for fixing a driving or driven component. The second coupling part, where it is to be inserted into the first coupling part and where it is to be expanded by fluid pressure, may be relatively thin-walled, with a wall thickness depending on the torque to be transmitted.

If the coupling is intended to serve as an overload coupling, the second coupling part may be provided with a pressure release valve which is operable in response to rotary movement of the first coupling part relative to the second coupling part when the transmitted torque exceeds the frictional force established between the coupling parts. When the pressure release valve reacts to such relative rotary movement to release the fluid pressure, there is no frictional force between the coupling parts and they can turn freely relative to one another.

Such pressure release valve may be arranged to be actuated by an actuating pin provided in the second coupling part and engaging the first coupling part.

BRIEF DESCRIPTION OF DRAWINGS

The invention will now be described by way of example with reference to the accompanying drawings, of which:

FIGS. 3 and 4 are respective sections of halves of two further embodiments of the invention;

DESCRIPTION OF PREFERRED EMBODIMENTS

Figure 1:
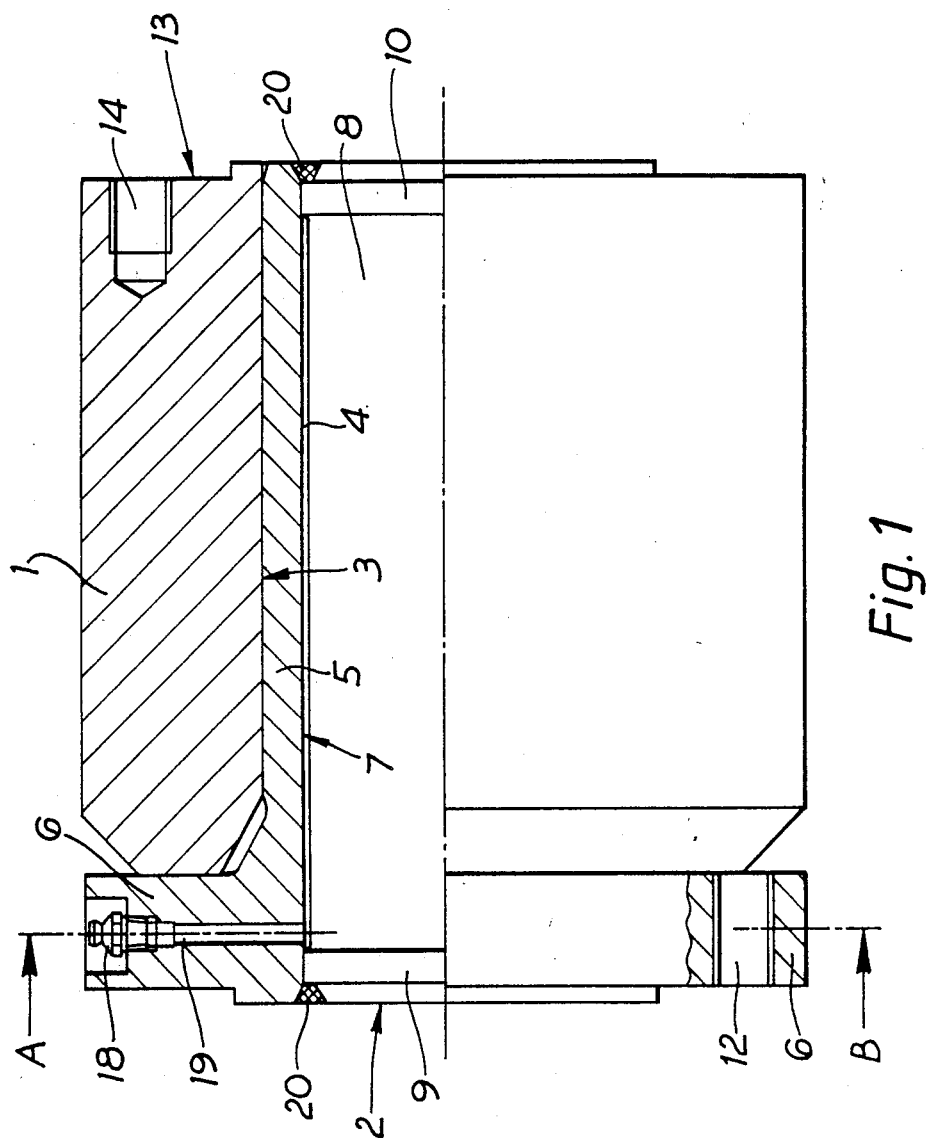
FIG. 1 is a partly sectioned view of a first embodiment of coupling according to the invention.

In the following description, the same reference numerals are used throughout for corresponding parts of the different embodiments, even though such parts may differ in their detail design.

Figure 2:
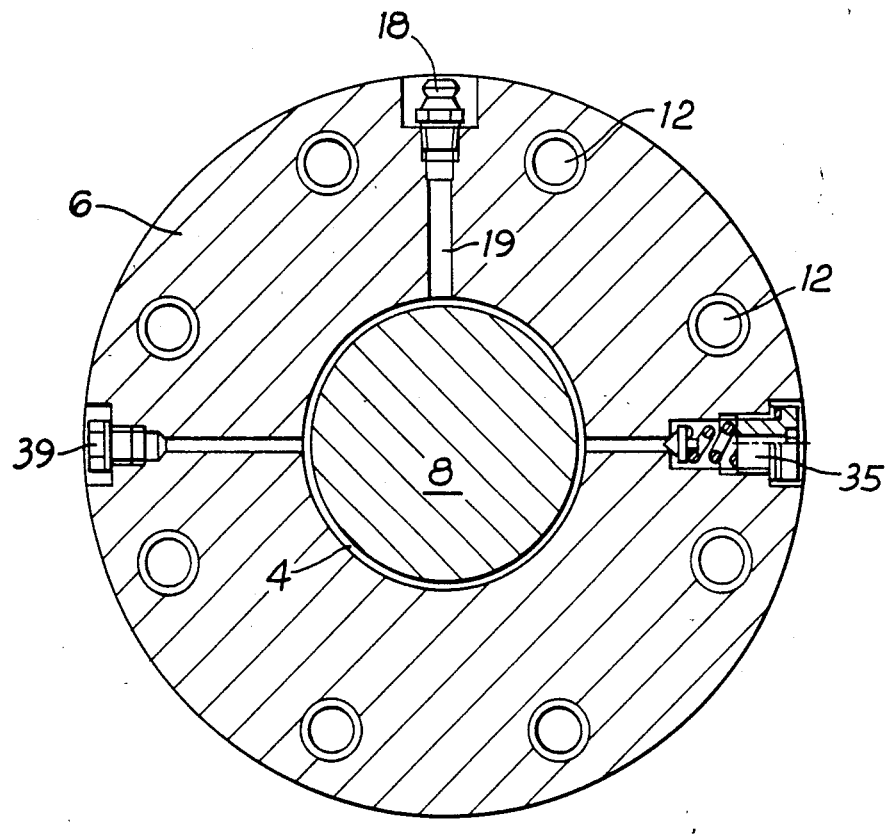
FIG. 2 is a section on the line A-B of FIG. 1.

In the embodiment of FIGS. 1 and 2, a coupling device comprises a first coupling part in the form of a thick-walled sleeve 1. One end face 13 of the coupling sleeve 1 has been provided with circumferentially distributed threaded bores 14 which are used to connect the first coupling part 1 to a driving or driven component. The first coupling part 1 further comprises a bore 3 into which the second coupling part 2 is inserted. The second coupling part 2 comprises a sleeve 5 with a cylindrical outer face which fits closely in the bore 3 of the first coupling part 1.

The sleeve 5 has a flange 6 integral with it. As can be seen in FIG. 2 in particular, the flange 6 has been provided with circumferentially distributed fixing bores 12 for connecting a driving or driven component. The sleeve 5 further comprises a bore 7 into which an insert 8 has been inserted. Between its ends the insert 8 is stepped to a smaller diameter than the diameter of the bore 7 of the sleeve 5. At its ends, the insert 8 has been provided with two collars 9, 10, resting against the wall of the bore 7 of the sleeve 5. The stepped diameter, i.e. the stepped axial region of the insert 8 is approximately 1-5 mm smaller than the diameter of the bore 7 of the sleeve 5. The space defined in between is used as a chamber 4 for receiving a pressurised fluid, especially a hydraulic oil. At its ends, i.e. in the region of its two collars 9, 10, the insert 8 is closely welded to the bore 7 of the sleeve 5 via welds 20.

The flange 6 has been provided with a radially extending bore used as a filling channel 19 provided with a filling valve 18 for connection to a source of fluid under pressure. Furthermore, as can be seen from FIG. 2, provision has been made for a pressure limiting valve 35 which, via a channel, is also connected to the oil chamber 4. If two components, i.e. a driving and a driven component are to be effectively engaged by the coupling device and used for torque transmitting purposes, the sleeve 5 of the second coupling part 2 is axially inserted into the bore 3 of the first coupling part. Subsequently, pressurised oil is pumped into the oil chamber 4 via the filling valve 18. As the sleeve 5 is relatively thin, it is radially expanded, thereby coming to rest firmly against the wall of the bore 3 of the first coupling part 1. In consequence, a friction-locking connection is established between the sleeve 5 on the one hand and the wall of the bore 3 on the other hand.

The transferable torque depends on the pressure in the oil chamber 4. To be able to set the required pressure, provision has been made for the pressure limiting valve 35 to be adjusted via adjusting washers for example. When the set pressure has been reached, the valve cone lifts off the sealing seat. To disengage the coupling, which requires reduction of the oil pressure, a pressure release bolt 39 is unfastened and after release of the pressure it is tightened again.

Torque is transmitted only via the sleeve 5 onto the first coupling part 1, i.e. the components having to transmit the torque do not comprise any sealing faces. In particular, no torque is transmitted via the welds 20.

In the embodiment of FIG. 3, the insert 8 is designed as a thick-walled tube. Otherwise, this embodiment is as shown in FIG. 1.

In the embodiment of FIG. 4, the insert is in the form of a bolt which is only loosely inserted into the bore 7 of the sleeve. For this purpose, the two collars 9, 10 have been provided with recesses in which O-ring seals 36 are received. The bolt 8 is held axially in the bore 7 of the sleeve 5 by securing rings 23.

Figure 5:
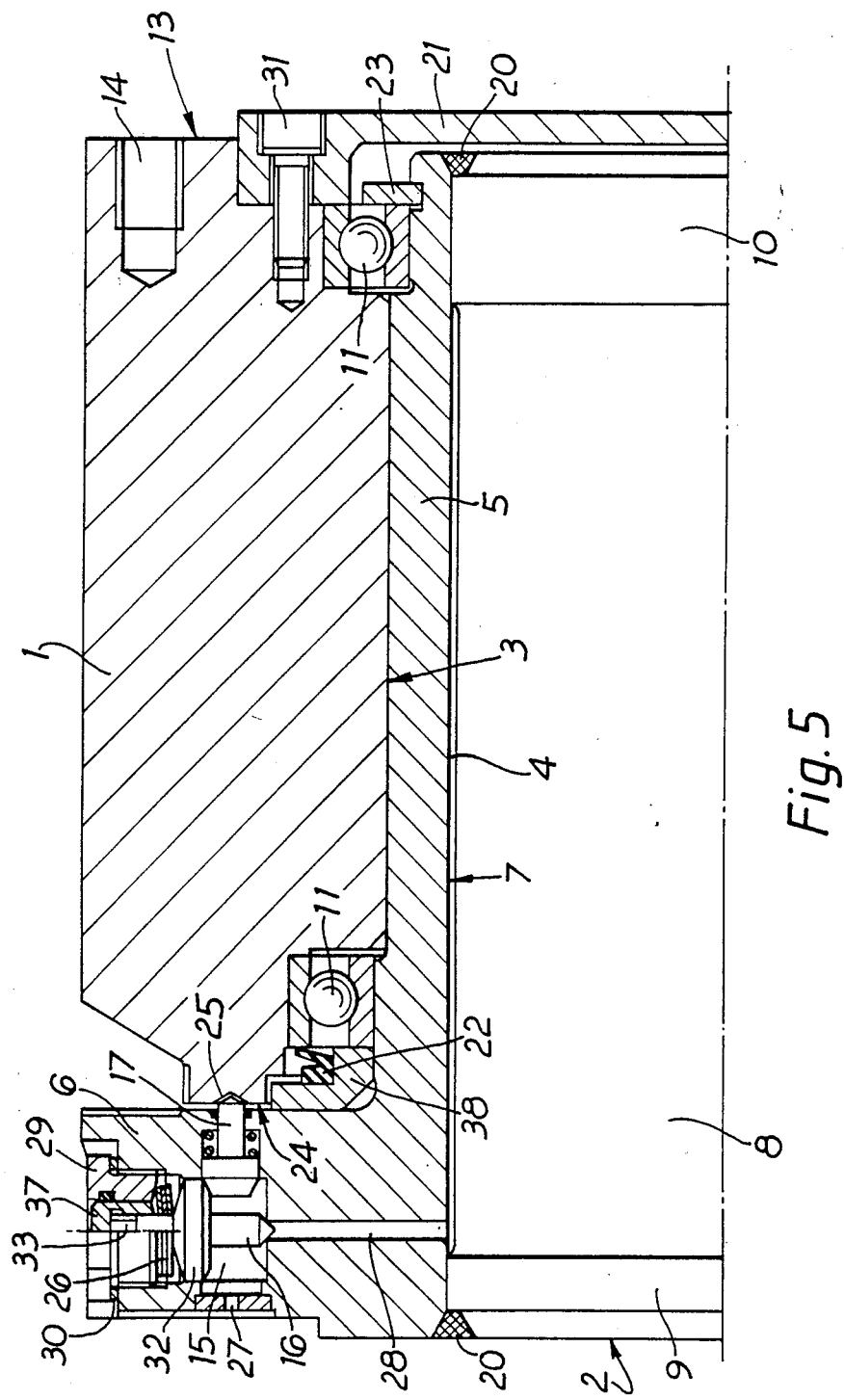
FIG. 5 is a longitudinal section through part of a further embodiment of coupling according to the invention.
Figure 6:
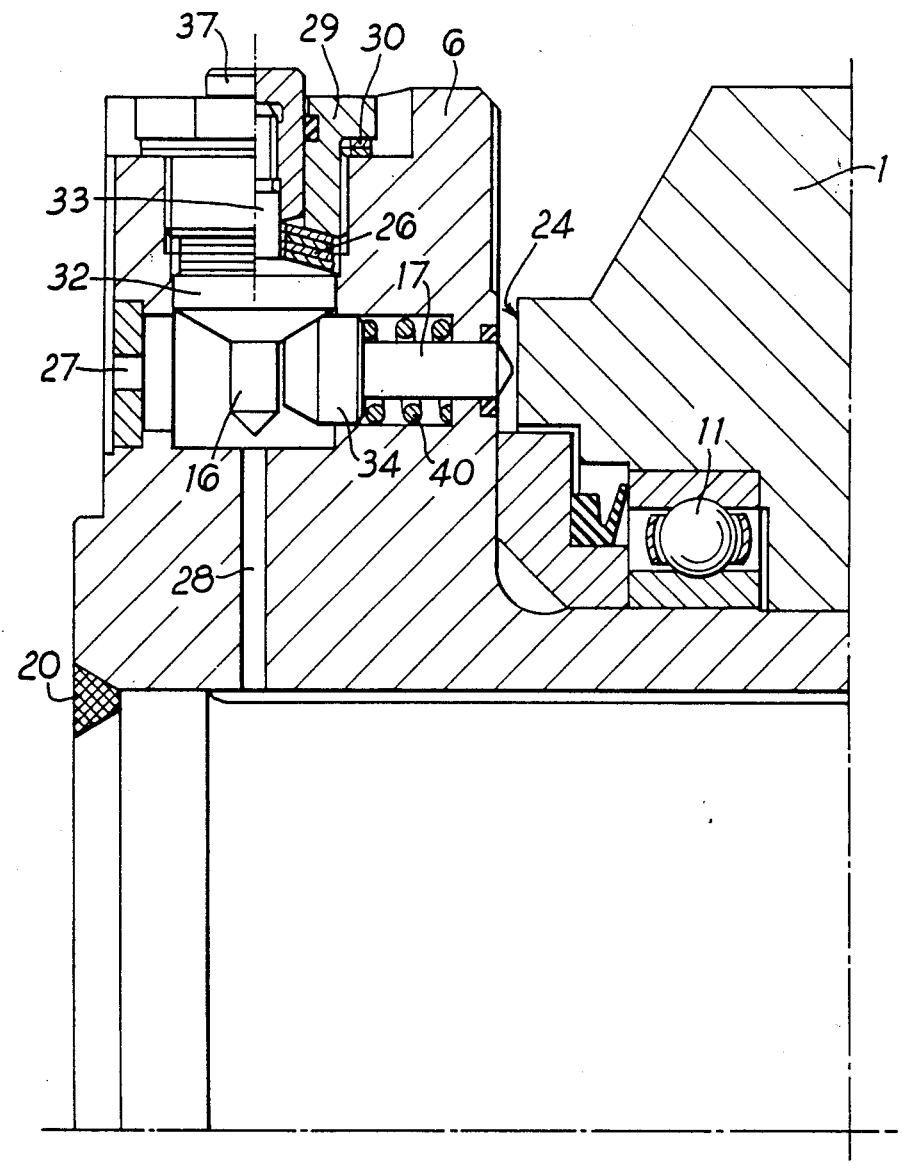
FIG. 6 is a section on an enlarged scale through part of the embodiment of FIG. 5.

The coupling device of FIGS. 5 and 6 simultaneously serves as an overload coupling, i.e in the case of overloading, freewheeling takes place. In the embodiment shown, the insert 8 is in the form of a solid bolt, provided with collars 9, 10 which are sealed in the bore 7 by welds 20. The second coupling part is also received with its sleeve 5 in the bore 3 of the first coupling part, but in addition, it is held so as to be rotatable relative to it by spaced rolling element bearings 11. The outer races of the two roller bearings 11 are received in corresponding stepped bores of the first coupling part 1. The inner race of the roller bearing 11 shown on the righthand side of FIG. 5 is arranged on a stepped cylindrical face of the coupling sleeve 5 and is held on the coupling sleeve 5 against axial displacement by a securing ring 23. The outer race of the roller bearing 11 is held in position via a cover 21 secured by bolts 31 to the first coupling part 1. The second roller bearing 11 shown on the lefthand side of FIG. 5 is also arranged on a cylindrical step of the coupling sleeve 5 and in a stepped bore of the first coupling part 1. The inner race of the roller bearing 11 is contacted by a spacer ring 38 which has its other end face supported against a radial face of the flange 6 connected to the sleeve 5. The spacer ring 38 is associated with a seal 22 which serves to seal the roller bearing 11. An outlet channel 28 is connected to the oil chamber 4.

From the outer circumferential surface of the flange 6 there extends, radially inwardly, a bore in which a pressure releasing valve is arranged. This pressure releasing valve comprises a valve head 16 with a conical end which is able to close an outlet channel 28. The valve head 16 extends from a guiding collar 32 having a threaded shank 33 to which is bolted a guiding bush 37. The guiding bush is guided in a bore of a screw plug 29. One or several spring washers 26, biassing the conical end of the valve head 16 towards the outlet channel 28, are arranged between the end face of the plug 29 and the guiding collar 32.

A space 15 with which the outlet channel 28 communicates after the conical end of the valve head 16 has lifted, is connected to the free atmosphere via an aperture 27. When the sealing cone of the valve head 16 lifts off the outlet channel 28, the pressurised fluid may escape abruptly from the oil chamber 4, so that the pressure is reduced and there is no longer a friction-locking connection between the outer face of the sleeve 5 and the wall of the bore 3 of the first coupling part 1. The sleeve 5 is then able to rotate freely relative to the first coupling part 1. The spring washers 26 are designed in such a way that after a certain lift of the valve head 16 is exceeded, they snap over centre into an unloaded position and remain in this position. The pretension of the spring washers is determined by the distance by which the screw plug 29 is screwed into the flange 6, which may be selected by using suitable adjusting washers 30 beneath the head of the plug.

The guiding collar 32 of the valve head 16 is in contact with a head 34 of an actuating pin 17 which is axially movable in the flange 6. The head 34 has a frusto-conical end portion engaging a frusto-conical under-surface of the collar 32, these being held in contact by a spring 40. The shank of the actuating pin 17 comprises a conical point which engages into a corresponding recess 25 in the end face 24 of the first coupling part 1 when the coupling is in the engaged condition. If, as shown in FIG. 6, an overload occurs, so that the frictional forces between coupling parts 1 and 2 are overcome, the first coupling part 1 moves relative to the second coupling part 2, so that also the flange 6 rotates relative to the end face 24. In the process, the conical point of the actuating pin 17 is moved out of the recess 25, and due to the cooperation between its head 34 and the guiding collar 32, the sealing cone of the valve head 16 is lifted off the outlet channel 28 and establishes a connection between the oil chamber 4 and the free atmosphere via the outlet channel 28 and the aperture 27. There is then no frictional connection between the coupling parts 1 and 2, and the roller bearings 11 permit relative rotation therebetween to be almost free. As can be seen from FIG. 6, the spring washers 26 go overcentre and remain in the new resting position. Re-engagement of the coupling can be achieved only by exerting pressure on the guiding bush 37 radially projecting from the screw plug, with the end face of the guiding bush 37 resting against the inner diameter region of the spring washers pushing these beyond the planar position so that they snap back into their starting position, i.e the valve is closed again. Such movement of the valve head in turn moves the actuating pin 17 axially so that its end engages the recess 25 in the coupling part 1; prior to this the coupling parts 1 and 2 have to be set in the appropriate angular position so that the pin 17 aligns with the recess 25. Subsequently, re-tensioning of the coupling may be effected by applying hydraulic pressure. In addition, just as in the other embodiments, provision may be made for a pressure limiting valve 35 which reacts earlier, i.e. at a lower pressure than that necessary to cause the valve head 16 of the chamber to lift from the outlet channel 28.

I claim:

1. A coupling, comprising:
    a first coupling part affording a first cylindrical bore;
    a second coupling part comprising a sleeve insertable in the first bore, the sleeve having a cylindrical outer surface and affording a second bore, the second coupling part also having a driving flange at one end of the sleeve;
    an insert within the second bore having an external surface spaced from the internal surface of the second bore and spaced collar formations extending outwardly from said external surface and sealed to the internal surface to define therewith and with said external surface a space for the reception of hydraulic fluid;
    radially extending channel means in the flange communicating with said space; and
    means associated with said channel means for filling said space with hydraulic fluid, for pressurizing the fluid to expand the sleeve into frictional driving engagement with the first bore and for releasing the hydraulic pressure in said space.

2. A coupling according to claim 1 wherein the collar formations of the insert are welded to the internal surface of the bore of the second coupling part.

3. A coupling according to claim 1 wherein the collar formations of the insert are provided with seals to establish fluid-tight engagement with the internal surface of the bore of the second coupling part.

4. A coupling according to claim 3 wherein the insert is secured against axial displacement within the bore of the second coupling part by securing rings.

5. A coupling according to claim 1 wherein the flange of the second coupling part is provided with circumferentially distributed fixing bores.

6. A coupling according to claim 1 wherein the first coupling part comprises a thick-walled sleeve having an end face provided with threaded bores for attachment of a driving or driven component.

7. A coupling comprising:
    a first coupling part affording a first cylindrical bore;
    a second coupling part comprising a sleeve inserted in the first bore and supported for rotation in said bore by bearing means interposed between the first and second coupling parts, the sleeve having a cylindrical outer surface and affording a second bore, the second coupling part also having a driving flange at one end of the sleeve;
    an insert within the second bore having an external surface spaced from the internal surface of the second bore and spaced collar formations extending outwardly from said external surface and sealed to the internal surface so as to define therewith and with said external surface a space for the reception of hydraulic fluid; and
    means for communicating with said space for filling said space with hydraulic fluid and pressurizing the fluid to expand the sleeve into frictional driving engagement with the first coupling part.

8. A coupling according to claim 7, wherein said communicating means include radially extending channel means in said flange, and further comprising pressure-release means associated with said channel means for releasing the hydraulic pressure in said space.

9. A coupling according to claim 8, wherein said pressure release means is operable by an actuating pin mounted on said flange and engageable with the first coupling part to release the pressure in said space upon relative rotation between the first and second coupling parts.

10. A coupling comprising:
    a first coupling part affording a first cylindrical bore;
    a second coupling part comprising a sleeve insertable in the first bore, the sleeve having a cylindrical outer surface and affording a second bore, the second coupling part also having a driving flange at one end of the sleeve;
    an insert within the second bore having an external surface spaced from the internal surface of the second bore and spaced collar formations extending outwardly from said external surface and sealed to the internal surface so as to define therewith and with said external surface a space for the reception of hydraulic fluid;
    radially extending channel means in the flange communicating with said space; and
    associated with said channel means, a means for filling said space with hydraulic fluid, means for pressurizing the fluid to expand the sleeve into frictional driving engagement with the first bore and means for releasing the hydraulic pressure in said space upon relative rotation between the first and second coupling parts, said pressure-release means being operable by an actuating pin mounted on said flange and engageable with the first coupling part when said relative rotation takes place.

* * * * *